United States Patent
Henry et al.

(10) Patent No.: US 9,228,518 B2
(45) Date of Patent: Jan. 5, 2016

(54) METHODS AND SYSTEM TO PREVENT EXHAUST OVERHEATING

(75) Inventors: Luke Henry, Lawrence Park, PA (US); Daniel Edward Loringer, Lawrence Park, PA (US); James Robert Mischler, Lawrence Park, PA (US); Neil Xavier Blythe, Lawrence Park, PA (US); Matthew John Malone, Lawrence Park, PA (US); Greg Thomas Polkus, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 13/602,813

(22) Filed: Sep. 4, 2012

(65) Prior Publication Data

US 2014/0067236 A1 Mar. 6, 2014

(51) Int. Cl.
| | |
|---|---|
| *F01N 3/00* | (2006.01) |
| *F02D 41/14* | (2006.01) |
| *F02D 31/00* | (2006.01) |
| *F02D 41/00* | (2006.01) |
| *F02B 37/00* | (2006.01) |
| *F02B 37/013* | (2006.01) |
| *F02B 37/16* | (2006.01) |
| *F02B 37/18* | (2006.01) |
| *F02D 29/06* | (2006.01) |

(52) U.S. Cl.
CPC .......... *F02D 41/1446* (2013.01); *F02B 37/004* (2013.01); *F02B 37/013* (2013.01); *F02B 37/16* (2013.01); *F02B 37/18* (2013.01); *F02D 31/001* (2013.01); *F02D 41/0007* (2013.01); *F02D 41/0052* (2013.01); *F02D 29/06* (2013.01); *F02D 2250/18* (2013.01); *F02D 2250/24* (2013.01); *Y02T 10/144* (2013.01); *Y02T 10/47* (2013.01)

(58) Field of Classification Search
None
See application file for complete search history.

(56) References Cited

U.S. PATENT DOCUMENTS

| | | | | |
|---|---|---|---|---|
| 4,400,944 | A * | 8/1983 | Iwamoto et al. | 60/605.1 |
| 5,107,432 | A * | 4/1992 | Martinelli | 701/112 |
| 6,550,718 | B2 * | 4/2003 | Maehara | 244/53 R |
| 6,609,372 | B2 * | 8/2003 | Maddock et al. | 60/602 |
| 7,305,825 | B2 * | 12/2007 | Ruiz et al. | 60/602 |
| 7,640,727 | B2 | 1/2010 | Kitahara | |
| 8,567,192 | B2 * | 10/2013 | Chi et al. | 60/612 |
| 2009/0044515 | A1 * | 2/2009 | Lu et al. | 60/277 |
| 2009/0151337 | A1 * | 6/2009 | Tornambe | 60/295 |
| 2014/0041380 | A1 * | 2/2014 | Byrd et al. | 60/602 |

* cited by examiner

*Primary Examiner* — Jesse Bogue
(74) *Attorney, Agent, or Firm* — GE Global Patent Operation; John A. Kramer

(57) ABSTRACT

Various methods and systems are provided for lowering exhaust gas temperature. In one embodiment, a method comprises increasing an air-to-fuel ratio of an engine in response to an exhaust gas temperature exceeding a threshold temperature value to lower the exhaust gas temperature to a temperature below the threshold temperature value.

13 Claims, 4 Drawing Sheets

METHODS AND SYSTEM TO PREVENT EXHAUST OVERHEATING

FIELD

Embodiments of the subject matter disclosed herein relate to an engine, engine components, and an engine system, for example.

BACKGROUND

Engine systems may be configured with a turbocharger or other exhaust components closely coupled to the cylinder exhaust outlets. If the exhaust gas temperature reaches a high enough level, damage to the turbocharger or other components may result.

BRIEF DESCRIPTION

In one embodiment, a method comprises increasing an air-to-fuel ratio of an engine in response to an exhaust gas temperature exceeding a threshold temperature value, to lower the exhaust gas temperature to a temperature below the threshold temperature value.

In this way, when exhaust gas temperatures are elevated to temperatures that may degrade downstream components, the air-to-fuel ratio of the engine may be increased. By increasing the air-to-fuel ratio, peak combustion temperature may be lowered, thus lowering the exhaust gas temperature.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments for cooling exhaust gas. High exhaust gas temperatures may cause damage to a turbocharger or other components situated in an exhaust passage. To cool the exhaust, cylinder air-to-fuel ratio may be increased. By increasing the air-to-fuel ratio, more air is present in the cylinder, increasing the cylinder's heat capacity and lowering combustion temperatures. The air-to-fuel ratio may be increased without adjusting the amount of fuel delivered to the cylinders, for example by increasing engine speed or closing an air control valve, such as a high-pressure turbine bypass valve.

Figure 1:
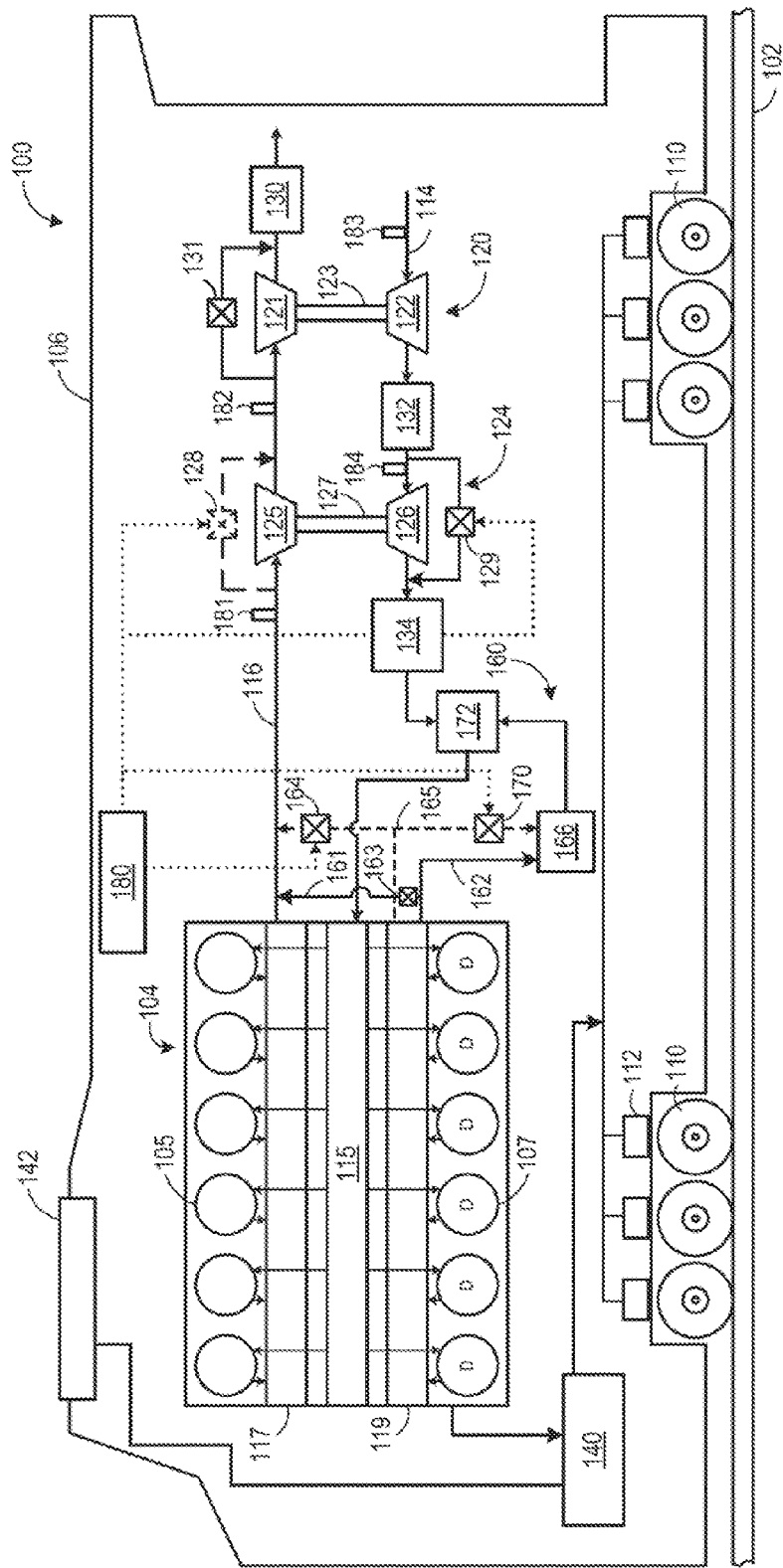
FIG. 1 shows a schematic diagram of a rail vehicle with an engine according to an embodiment of the invention.

The approach described herein may be employed in a variety of engine types, and a variety of engine-driven systems. Some of these systems may be stationary, such as in a powerplant or generator-set application, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV) and rail vehicles. For clarity of illustration, a rail vehicle is provided as an example of a mobile platform supporting a system incorporating an embodiment of the invention. For example, FIG. 1 shows a block diagram of an embodiment of a vehicle system 100, herein depicted as a rail vehicle 106 (e.g., a locomotive), configured to run on a rail 102 via a plurality of wheels 110. As depicted, the rail vehicle 106 includes an engine 104.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density, and/or fuels such as natural gas, through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of non-donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate FOR passage 165 (illustrated by the dashed lines) that is configured to selectively route exhaust to the intake or to the exhaust passage. For example, when a second valve 170 is open, exhaust may be routed from the donor cylinders to the EGR cooler 166 and/or additional elements prior to being routed to the intake passage 114.

Further, the alternate EGR system includes a first valve 164 disposed between the exhaust passage 116 and the alternate EGR passage 165. The second valve 170 may be an on/off valve controlled by the control unit 180 (for turning the flow of EGR on or off), or it may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the exhaust passage 116 to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, first turbocharger 120 is provided with a turbine bypass valve 131. The turbine bypass valve 131 may be opened, for example, to divert the exhaust gas flow away from the first turbine 121. In this manner, the rotating speed of the compressor 122, and thus the boost provided by the turbochargers 120, 124 to the engine 104 may be regulated during steady state conditions. In some embodiments, the second turbocharger 124 may be alternatively or additionally provided with a turbine bypass valve 128 (depicted in dashed lines) which allows exhaust gas to bypass the second turbocharger 124. The turbine bypass valve 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 may also include a self-load system that may include the engine 104, alternator/generator 140, resistive grids 142, and/or additional components. The self-load system may convert excess engine output to electricity via the alternator/generator 140, which may then be dissipated to one or more vehicle batteries or other energy storage devices, unloaded via the engine electrical system, and/or rooted to the resistive grids 142, which dissipate the energy as heat. Thus, in the self-load mode, the engine is operated to generate excess torque and/or power beyond the traction motor demands by operating at a higher than necessary speed and load (for the requested torque), with the excess energy being dissipated to the self-load system. For example, the self-load system operation may include dissipating excess electrical power generation through various devices, including the resistive grids 142 and/or to charge one or more of batteries of the engine.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

As described in more detail below, the control unit may be configured to regulate exhaust gas temperatures by controlling one or more of engine air handling valves (e.g., turbine bypass valve) and engine speed. The air handling valves and/or engine speed may be regulated in order to increase engine air-to-fuel ratio, in turn lowering exhaust gas temperature. In one example, the control unit may include a regulator configured to receive signals front an exhaust gas temperature sensor, and based on the temperature signals, perform a closed-loop regulation on the position of the turbine bypass valve in order to maintain exhaust gas temperature below a threshold value. As the engine may be operated with an upper limit air-to-fuel ratio (for example, to maintain engine efficiency), the control unit may be further configured to override the air-to-fuel ratio limit. Additionally, the turbocharger that includes the turbine bypass valve may have a maximum allowed mass air flow limit, and the control unit may be further configured to override the maximum air flow amount.

Figure 2:
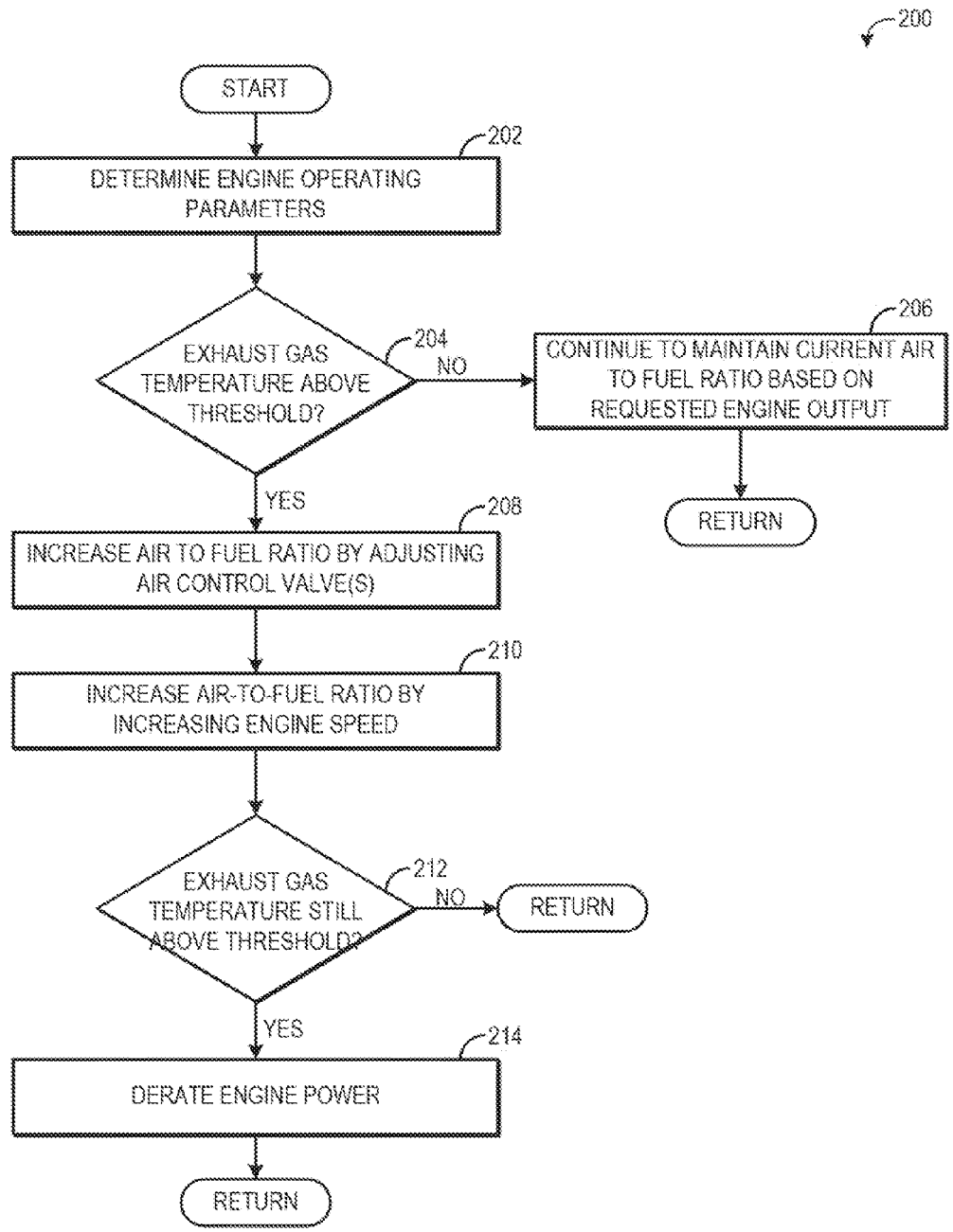
FIG. 2 is a flow chart illustrating a method for controlling air-to-fuel ratio according to an embodiment of the invention.

Turning to FIG. 2, a method 200 for lowering exhaust gas temperatures is provided. Method 200 may be carried out by an engine control system, such as control unit 180 of FIG. 1, in order to control exhaust gas temperatures in a lean combustion, compression ignition engine, such as the engine 104 described above. Method 200 comprises, at 202, determining engine operating parameters. As explained above, the control unit may receive input from a variety of engine sensors in order to monitor the engine operating parameters. The engine operating parameters may include exhaust gas temperature, which may be measured by an exhaust gas sensor, such as sensor 181 of FIG. 1. In other embodiments, the exhaust gas temperature may be determined based on a model that estimates exhaust gas temperature from other engine parameters, such as air-to-fuel ratio, engine speed, engine load, etc.

At 204, it is determined if the exhaust gas temperature is above a threshold temperature value. The threshold temperature value may be a temperature above which degradation to downstream engine components, such as turbochargers, exhaust aftertreatment device, etc., may occur. If the exhaust gas temperature is not above the threshold, method 200 proceeds to 206 to continue to maintain current air-to-fuel ratio based on requested engine output. The amount of fuel delivered to the engine may be adjusted based on operator-requested torque, and thus when exhaust gas temperatures are below the threshold, the air-to-fuel ratio is based on requested engine output. Method 200 then returns.

Returning to 204, if it is determined that the exhaust gas temperature is above the threshold, method 200 proceeds to 208 to increase air-to-fuel ratio, for example by adjusting an air control valve. If the exhaust gas temperature is relatively high, it may be lowered by increasing the air-to-fuel ratio. However, in order to maintain requested torque, the amount of fuel delivered to the engine cannot simply be decreased. Rather, the amount of charge air may be increased by adjusting an air control valve and/or increasing engine speed, as explained below.

In one example, the air control valve may be a turbine bypass valve, for example the turbine bypass valve 128 of the high-pressure turbocharger 124. To increase air-to-fuel ratio, the turbine bypass valve may be closed, thus directing an increased amount of exhaust through the turbine and therefore increasing the compression of the intake air and increasing the mass air flow of the intake air. Additionally, one or more EGR valves may be adjusted in response to the closing of the turbine bypass valve. For example, the EGR metering valve 164 may be opened and/or the EGR bypass valve 170 may be closed to increase the amount of EGR routed to the intake. In doing so, the fraction of oxygen in the intake air may remain constant even as the compression of the intake air (and hence mass air flow) increases.

In some embodiments, the adjusting of the air control valve or valves may be the only mechanism utilized to increase the air-to-fuel ratio. For example, the closing of the turbine bypass valve may increase the air-to-fuel ratio by a large enough amount to decrease the exhaust gas temperature to a level below the threshold. However, in other embodiments, the air-to-fuel ratio may be increased by increasing engine speed at 210, in addition to or in alternative of adjusting the air control valves. In one embodiment, in order to increase the engine speed without increasing vehicle speed, the engine speed target set by the control unit 180 may be increased without increasing the load placed on the engine by the alternator (to provide energy to power the traction motors), and thus maintain vehicle speed. Typically, the speed of the engine is controlled by the control unit in order to provide the output needed to satisfy the alternator load. However, by increasing this target engine speed at a constant brake power, a decrease in torque and fuel rate results (assuming changes in internal engine friction are negligible). Therefore, if manifold conditions (e.g., boost) stay about the same, the reduction in fuel rate causes an increase to the air-to-fuel ratio.

In another embodiment, the engine speed may be increased and the excess torque that is produced as a result of the increased engine speed may be placed on the alternator/generator rather than the traction motors. The alternator/generator may then shift the excess electrical energy to the engine self-load system, by converting excess engine output to electricity via the alternator/generator. The electricity may be dissipated to one or more vehicle batteries or other energy storage devices, unloaded via the engine electrical system, and/or routed to a resistor grid, which dissipates the energy as heat. Thus, in the self-load mode, the engine is operated to generate excess torque and/or power beyond the traction motor demands by operating at a higher than necessary speed and/or load, with the excess energy being dissipated to the self-load system. For example, the self-load system operation may include dissipating excess electrical power generation through various devices, including, the resistive grids 142 and/or to charge one or more of the batteries. The excess energy may be routed to the self-load system if the self-load system is below a self-load capacity. The capacity may be a function of the storage state of one or more batteries coupled to the alternator generator. Further, the capacity may be a function of the load placed on the rail vehicle by the electrical system. For example, if the electrical system is at high demand, the self-load system may have a higher capacity to accept energy generated by the engine. Additionally, the temperature of the resistive aids may determine the capacity of the self-load system. If the resistor grids are above a threshold temperature, additional energy may not be routed to the grids, as the increase in temperature may cause degradation of the grids. Thus, the capacity of the system is determined by monitoring battery state of charge, electrical system demand, and/or grid temperature.

At 212, it is determined if the exhaust gas temperature is still above the threshold. The threshold may be the same threshold temperature value utilized during the initial assessment of the exhaust gas temperature at 204. However, in other embodiments the threshold used at 212 may be a second threshold temperature value that is different than the initial threshold, for example the second threshold ma be slightly lower, in order to prevent frequent adjustments to the air-to-fuel ratio as the exhaust gas temperature fluctuates around the initial threshold. If the exhaust gas temperature is no longer above the threshold, method 200 returns. If the exhaust gas temperature is still above the threshold, method 200 proceeds to 214 to derate engine power in order to further lower exhaust gas temperatures, and then method 200 ends.

Figure 3:
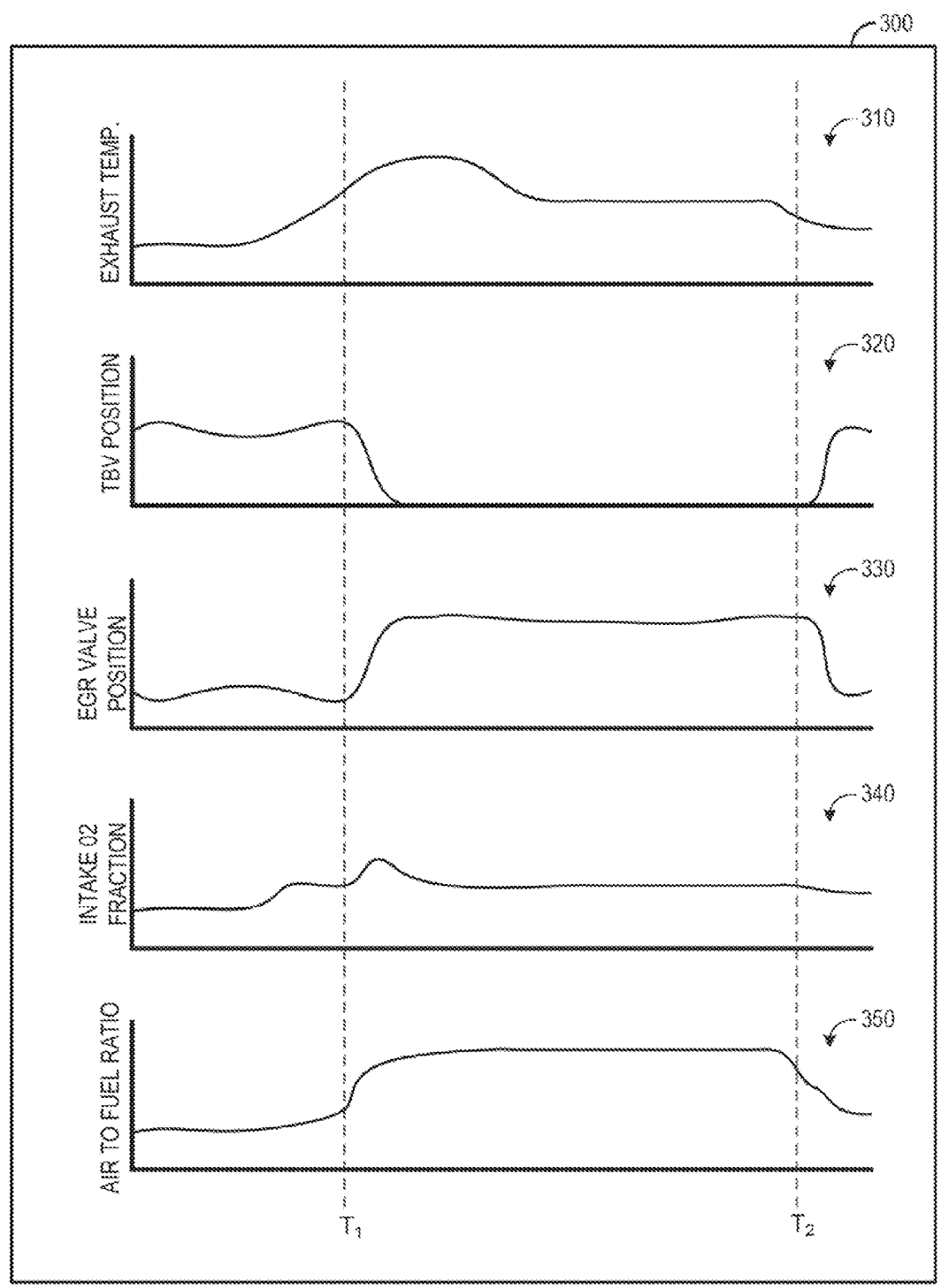
FIG. 3 is a set of diagrams illustrating engine operating parameters during an air-to-fuel ratio adjustment according to an embodiment of the invention.
Figure 4:
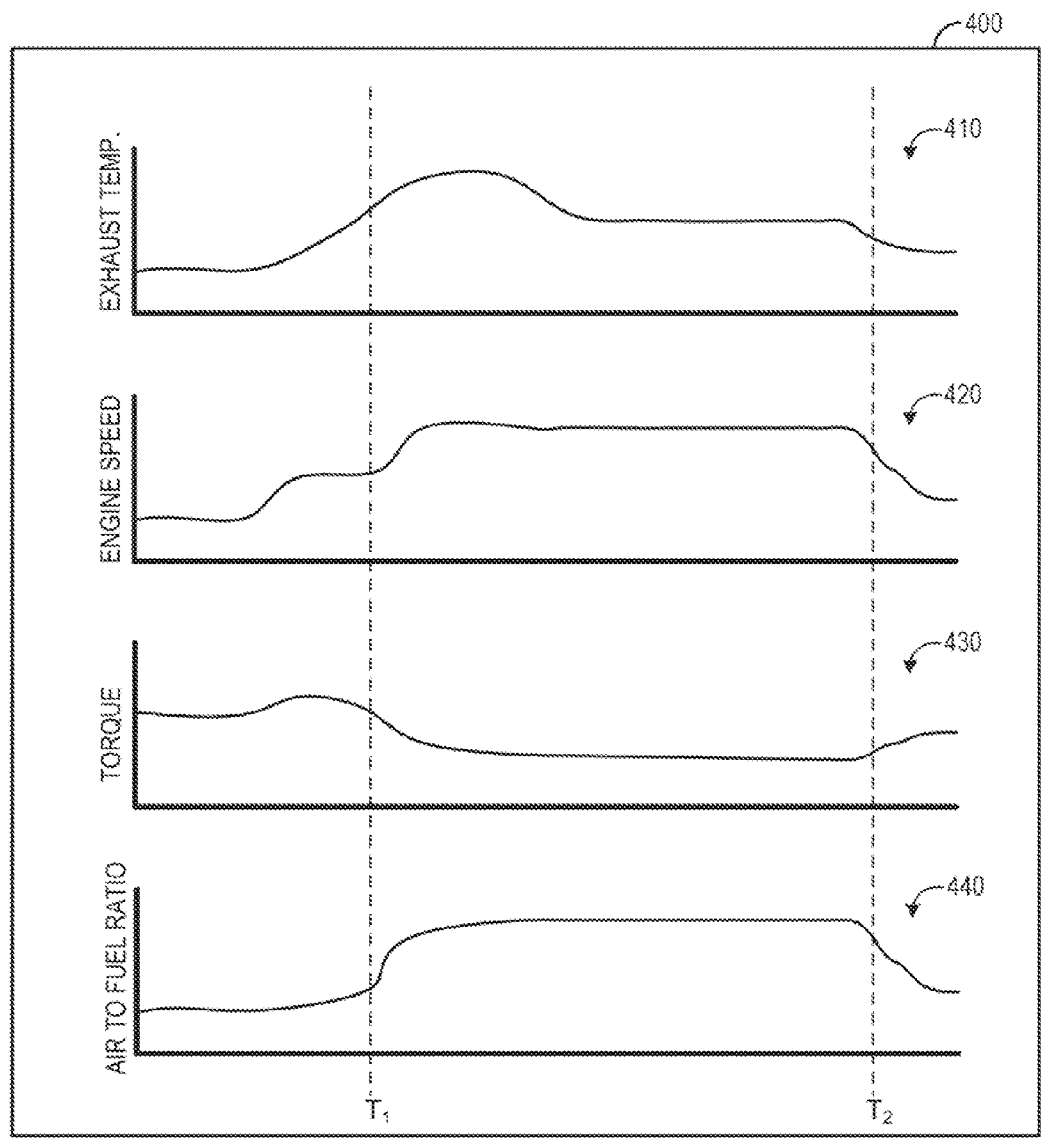
FIG. 4 is a set of diagrams illustrating engine operating parameters during another air-to-fuel ratio adjustment according to an embodiment of the invention.

FIGS. 3 and 4 are sets of diagrams depicting various engine operating parameters during the air-to-fuel ratio adjustment described above. FIG. 3 illustrates a first set of diagrams 300 depicting engine operating parameters during the adjustment to the air control valves, while FIG. 4 illustrates a second set of diagrams 400 depicting engine operating parameters during the adjustment to the engine speed. Referring first to FIG. 3, exhaust gas temperature is illustrated in diagram 310, turbine bypass valve (TBV) position is illustrated in diagram 320, EGR valve position is illustrated in diagram 330, intake oxygen concentration is illustrated in diagram 340, and air-to-fuel ratio is illustrated in diagram 350. For each diagram, time is depicted on the horizontal axis and the respective operating parameter is illustrated on the vertical axis. Further, for diagrams 320 and 330, which illustrate TBV and EGR valve positions, the start of the vertical axis (e.g., the intercept between the vertical and horizontal axes) represents the fully closed position, with the position moving towards fully open as the values of the vertical axes increase.

Starting with diagram 310, exhaust gas temperature starts relatively low, but then begins to increase, due to the vehicle climbing a hill, entering a tunnel, or other operating condition in which exhaust gas temperatures may increase. At time $T_1$, indicated by the first dashed line, the exhaust temperature increases above a threshold. In response, according to the method 200 of FIG. 2 described above, one or more air control valves may be adjusted to increase air-to-fuel ratio and lower exhaust temperatures. Thus, as shown in diagram 320, the TBV is moved into the fully closed position. To maintain the intake oxygen fraction at a constant level, the EGR valve may be opened, as illustrated in diagram 330, to increase the amount of EGR directed to the intake of the engine. As shown in diagram 340, the intake oxygen fraction remains constant during the duration of elevated air-to-fuel ratio. The air-to-fuel ratio is depicted in diagram 350, and increases after time $T_1$.

At time $T_2$, depicted by the second dashed line, the exhaust gas temperature falls below a second threshold, and the routine to increase air-to-fuel ratio ends. Thus, control of the air control valves and the air-to-fuel ratio returns to standard control, wherein the turbine bypass valve position is determined based on mass air flow through the turbocharger, desired levels of boost, etc., the EGR valve position is determined based on a designated intake oxygen fraction for controlling engine emissions, and air-to-fuel ratio is determined based on requested engine output.

Turning to FIG. 4, the set of diagrams 400 includes an exhaust gas temperature diagram 410, engine speed diagram 420, torque diagram 430, and air-to-fuel ratio diagram 440. Similar to FIG. 3, each diagram depicts time along the horizontal axis and the respective operating parameter along the vertical axis. Referring to diagram 410, the exhaust gas temperature increases above the threshold at time $T_1$. To decrease the exhaust gas temperature, the air-to-fuel ratio may be increased (as shown in diagram 440) by increasing engine speed, as depicted in diagram 420. As described above, the engine speed may be increased by increasing the target engine speed set by the control unit. As the brake power remains constant, the amount of torque transferred from the engine to the wheels may decrease, as depicted in diagram 430.

Thus, for both FIGS. 3 and 4, the air-to-fuel ratio may be increased during the time period between $T_1$ and $T_2$. At time $T_1$, the exhaust gas temperature increases above a first threshold, and the air-to-fuel ratio is increased in response to the elevated exhaust gas temperature. Then, at time $T_2$, the exhaust was temperature may drop below a second threshold, lower than the first, and thus the air-to-fuel ratio may be returned to its standard control. During the time between $T_1$ and $T_2$, the exhaust gas temperature may be kept below the first threshold due to the increased air-to-fuel ratio.

Thus, the method and system described herein provide for a method comprising increasing an air-to-fuel ratio of an engine in response to an exhaust gas temperature exceeding a threshold temperature value, to lower the exhaust gas temperature to a temperature below the threshold temperature value. In another embodiment, a method comprises measuring an exhaust gas temperature of an engine, e.g., using a sensor, or estimating the exhaust gas temperature based on other operating conditions. The method further comprises increasing an air-to-fuel ratio of the engine in response to the exhaust gas temperature that is measured exceeding a threshold temperature value, to lower the exhaust gas temperature to a temperature below the threshold temperature value. In another embodiment, a method comprises adjusting an air-to-fuel ratio based on requested engine output when exhaust gas temperature is below a threshold temperature value, and increasing the air-to-fuel ratio by adjusting one or more air control valves to lower the exhaust gas temperature when exhaust gas temperature is above the threshold temperature value (e.g., the air-to-fuel ratio is increased responsive to the exhaust gas temperature being above the threshold temperature value). The one or more air control valves may comprise a turbine bypass valve of a high-pressure turbocharger of a multi-stage turbocharger system, and in one example, increasing the air-to-fuel ratio may comprise closing the turbine bypass valve. In another example, increasing the air-to-fuel ratio may comprise increasing engine speed. The engine speed may be increased independent of vehicle speed by dissipating excess electrical energy generated by the increased engine speed to a self-load system.

The method may also include opening an exhaust gas recirculation valve to route exhaust gas to an intake of the engine during the increase in the air-to-fuel ratio to maintain a constant intake oxygen concentration in the intake of the engine and/or to maintain a constant level of NOx in the exhaust gas. The exhaust gas recirculation valve may be opened to route exhaust gas from a subset of cylinders of the engine to the intake, and exhaust gas from remaining cylinders may be routed exclusively to atmosphere.

Further, the method may include increasing the air-to-fuel ratio while maintaining an amount of fuel delivered to the engine to provide requested engine output.

In another example, an engine system comprises an exhaust passage coupled to the engine; an exhaust gas recirculation (EGR) system coupled to the exhaust passage and to an intake passage of the engine; a multi-stage turbocharger system including a high-pressure turbocharger and a low-pressure turbocharger positioned in the exhaust passage; and a control unit configured to close a turbine bypass valve of the high-pressure turbocharger to increase engine air-to-fuel ratio to cool the exhaust gas in response to an exhaust gas temperature exceeding a threshold temperature value.

The control unit may be configured to deliver an amount of fuel to cylinders of the engine based on requested engine output, and the requested amount of fuel may maintain a lean air-to-fuel ratio. The control unit may be configured to derate engine power if the turbine bypass valve is fully closed and the exhaust gas temperature still exceeds the threshold temperature value. Air-to-fuel ratio is the ratio between mass of air and mass of fuel ($m_{air}/m_{fuel}$) present in the air-fuel mix for combustion. A stoichiometric air-to-fuel ratio has just enough air to completely burn the available fuel; in many engine systems, it is only desirable to control the air-to-fuel ratio to the stoichiometric ratio under light load conditions. A "lean" air-to-fuel ratio may be an air-to-fuel ratio that is higher than the stoichiometric ratio (less fuel per unit air) for a given engine system, while a "rich" air-to-fuel ratio may be an air-to-fuel ratio that is lower than the stoichiometric ratio (more fuel per unit air) for the given engine system.

The EGR system may further comprise a first cylinder group coupled to an EGR passage configured to route exhaust to the intake passage and the exhaust passage and a second cylinder group coupled exclusively to the exhaust passage of the engine. An EGR valve may be arranged in the EGR passage, and the control unit may be configured to open the EGR valve in response to the closing of the turbine bypass valve.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   increasing an air-to-fuel ratio of an engine by increasing engine speed of the engine in response to an exhaust gas temperature exceeding a threshold temperature value, to lower the exhaust gas temperature to a temperature below the threshold temperature value, where increasing the engine speed of the engine comprises generating additional engine output beyond a traction load, and dissipating excess electrical energy generated from the additional engine output to a self-load system.

2. The method of claim 1, further comprising increasing a mass air flow from a turbocharger to the engine to maintain torque output from the engine during the increase in the air-to-fuel ratio.

3. The method of claim 2, wherein increasing the mass air flow comprises closing a turbine bypass valve of the turbocharger.

4. The method of claim 1, wherein increasing the air-to-fuel ratio comprises maintaining an amount of fuel delivered to the engine to provide requested engine output.

5. The method of claim 1, wherein increasing the air-to-fuel ratio comprises decreasing an amount of fuel delivered to the engine.

6. The method of claim 1, wherein increasing the air-to-fuel ratio further comprises overriding a reference air-to-fuel ratio that is based on engine operating parameters.

7. A method, comprising:
   adjusting an air-to-fuel ratio of an engine based on requested engine output when exhaust gas temperature is below a threshold temperature value; and
   increasing the air-to-fuel ratio by adjusting one or more air control valves, to lower the exhaust gas temperature, when the exhaust gas temperature is above the threshold temperature value, wherein increasing the air-to-fuel ratio further comprises increasing an engine speed of the engine and wherein the engine speed is increased independent of vehicle speed of a vehicle in which the engine is operably disposed, by dissipating excess electrical energy generated by the increased engine speed to a self-load system.

8. The method of claim 7, wherein the one or more air control valves comprises a turbine bypass valve of a high-pressure turbocharger of a multi-stage turbocharger system, and wherein increasing the air-to-fuel ratio further comprises closing the turbine bypass valve.

9. The method of claim 7, further comprising opening an exhaust gas recirculation valve to route exhaust gas to an intake of the engine during the increase in the air-to-fuel ratio to maintain a constant intake oxygen concentration.

10. The method of claim 7, further comprising opening an exhaust gas recirculation valve to route exhaust gas to an intake of the engine during the increase in the air-to-fuel ratio to maintain a constant NOx level of the exhaust gas.

11. The method of claim 10, wherein opening the exhaust gas recirculation valve to route exhaust gas to the intake of the engine further comprises opening the exhaust gas recirculation valve to route exhaust gas from a subset of cylinders of the engine to the intake, wherein exhaust gas from remaining cylinders is routed to atmosphere.

12. The method of claim 7, wherein the air-to-fuel ratio is increased while maintaining an amount of fuel delivered to the engine to provide requested engine output.

13. A system, comprising: an engine controller programmed to increase an air-to-fuel ratio of an engine by increasing engine speed of the engine in response to an exhaust gas temperature exceeding a threshold temperature value, to lower the exhaust gas temperature to a temperature below the threshold temperature value, where increasing the engine speed of the engine comprises generating additional engine output beyond a traction load, and dissipating excess electrical energy generated from the additional engine output to a self-load system.

* * * * *